(12) United States Patent
Uptergrove et al.

(10) Patent No.: US 11,427,717 B2
(45) Date of Patent: *Aug. 30, 2022

(54) METHODS AND COMPOSITIONS FOR DIRECT PRINT HAVING IMPROVED RECYCLABILITY

(71) Applicant: Plastipak Packaging, Inc., Plymouth, MI (US)

(72) Inventors: Ronald L. Uptergrove, Northville, MI (US); Jennifer L. Renner, South Lyon, MI (US)

(73) Assignee: PLASTIPAK PACKAGING, INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,740

(22) Filed: Jul. 16, 2019

(65) Prior Publication Data
US 2020/0181432 A1    Jun. 11, 2020

Related U.S. Application Data

(60) Continuation of application No. 14/846,032, filed on Sep. 4, 2015, now Pat. No. 10,400,118, which is a
(Continued)

(51) Int. Cl.
*B41M 7/00* (2006.01)
*C09D 11/101* (2014.01)
(Continued)

(52) U.S. Cl.
CPC ........... *C09D 11/03* (2013.01); *B41M 5/0047* (2013.01); *B41M 5/0088* (2013.01);
(Continued)

(58) Field of Classification Search
CPC ........ C09D 11/03; C09D 9/00; C09D 11/033; C09D 11/101; B41M 5/0047;
(Continued)

(56) References Cited

U.S. PATENT DOCUMENTS

| 5,889,083 A | 3/1999 | Zhu |
| 5,947,917 A | 9/1999 | Carte et al. |

(Continued)

FOREIGN PATENT DOCUMENTS

| CN | 1489526 A | 4/2004 |
| CN | 1793245 A | 6/2006 |

(Continued)

OTHER PUBLICATIONS

International Search Report and Written Opinion were dated Dec. 29, 2016 by the International Searching Authority for International Application No. PCT/US2016//049690, filed on Aug. 31, 2016 and published as WO 2017/040654 on Mar. 9, 2017 (Applicant-Plastipak Packaging, Inc.) (10 Pages).

(Continued)

*Primary Examiner* — Yaovi M Ameh
(74) *Attorney, Agent, or Firm* — Ballard Spahr LLP

(57) ABSTRACT

The disclosure relates to ink compositions for digital printing on an external surface of a plastic article. The ink compositions comprise an ink removal-promoting additive. In some aspects, the ink removal-promoting additive can facilitate the separation or loosening of the image from the external surface of the article when the image is exposed to a liquid-based solution at an elevated temperature. Also disclosed are recyclable plastic articles having an external surface with an image printed thereon using the disclosed ink composition and methods for removing cured ink from a plastic container. This abstract is intended as a scanning tool for purposes of searching in the particular art and is not intended to be limiting of the present invention.

20 Claims, 2 Drawing Sheets

Related U.S. Application Data continuation-in-part of application No. 14/528,324, filed on Oct. 30, 2014, now Pat. No. 9,150,325, which is a division of application No. 13/168,181, filed on Jun. 24, 2011, now Pat. No. 8,876,979, which is a continuation-in-part of application No. 12/581,952, filed on Oct. 20, 2009, now abandoned.

(60) Provisional application No. 61/360,512, filed on Jul. 1, 2010, provisional application No. 61/106,860, filed on Oct. 20, 2008.

(51) Int. Cl.
| | | |
|---|---|---|
| *C09D 9/00* | (2006.01) | |
| *C09D 11/03* | (2014.01) | |
| *C09D 11/033* | (2014.01) | |
| *B41M 5/00* | (2006.01) | |
| *B65D 23/08* | (2006.01) | |

(52) U.S. Cl.
CPC ....... *B41M 7/0009* (2013.01); *B65D 23/0814* (2013.01); *C09D 9/00* (2013.01); *C09D 11/033* (2013.01); *C09D 11/101* (2013.01); *B41M 5/0011* (2013.01); *B41M 5/0064* (2013.01); *B65D 2203/00* (2013.01); *B65D 2565/385* (2013.01); *Y02W 30/80* (2015.05); *Y10T 428/24802* (2015.01); *Y10T 428/24942* (2015.01)

(58) Field of Classification Search
CPC .............. B41M 5/0088; B41M 7/0009; B41M 5/0011; B41M 5/0064; B65D 23/0814; B65D 2203/00; B65D 2565/385; Y02W 30/80; Y10T 428/24802; Y10T 428/24942
See application file for complete search history.

(56) References Cited

U.S. PATENT DOCUMENTS

| | | | |
|---|---|---|---|
| 6,135,654 | A | 10/2000 | Jennel |
| 6,147,041 | A | 11/2000 | Takahashi et al. |
| 7,625,059 | B2 | 12/2009 | Uptergrove |
| 7,736,713 | B2 | 6/2010 | Uptergrove |
| 8,876,979 | B2 | 11/2014 | Uptergrove et al. |
| 10,400,118 | B2 * | 9/2019 | Uptergrove .......... B41M 7/0009 |
| 2004/0127601 | A1 | 7/2004 | Sano et al. |
| 2006/0121219 | A1 | 6/2006 | Shelby et al. |
| 2006/0250464 | A1 | 11/2006 | Sheinman |
| 2009/0163615 | A1 * | 6/2009 | Halahmi ................ H05K 3/287 522/144 |
| 2011/0143047 | A1 | 6/2011 | Kappaun et al. |
| 2011/0247654 | A1 | 10/2011 | Uptergrove et al. |
| 2016/0222228 | A1 | 8/2016 | Uptergrove et al. |

FOREIGN PATENT DOCUMENTS

| | | |
|---|---|---|
| CN | 101163747 A | 4/2008 |
| CN | 102083924 A | 6/2011 |
| EP | 2288666 B1 | 5/2012 |
| JP | 2000-517370 | 12/2000 |
| JP | 2011-137122 | 7/2011 |
| JP | 2012-046671 | 3/2012 |
| WO | WO 98/10025 | 3/1998 |
| WO | WO-2017/040654 A1 | 3/2017 |

OTHER PUBLICATIONS

International Preliminary Report on Patentability was dated Mar. 6, 2018 by the International Searching Authority for International Application No. PCT/US2016//049690, filed on Aug. 31, 2016 and published as WO 2017/040654 on Mar. 9, 2017 (Applicant-Plastipak Packaging, Inc.) (7 Pages).
First Office Action was dated Aug. 2, 2019 by the SIPO for CN Application No. 201680055016, filed on Aug. 31, 2016 and published as CN 108698418 on Oct. 23, 2018 (Applicant—Plastipak Packaging, Inc.) (Translation—25 Pages).
European Search Report and Written Opinion were dated Mar. 15, 2019 by the European Patent Office for EP Application No. 16842898. 5, filed on Aug. 31, 2016 and published as EP 3341209 A1 on Jul. 4, 2018 (Applicant-Plastipak Packaging, Inc.) (5 Pages).
Requirement for Restriction/Election was dated Aug. 16, 2017 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (5 Pages).
Response to Requirement for Restriction/Election was dated Nov. 16, 2017 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (5 Pages).
Non Final Rejection was dated Dec. 27, 2017 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (6 Pages).
Response to Non Final Rejection was dated Jun. 27, 2018 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (6 Pages).
Final Rejection was dated Sep. 24, 2018 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (7 Pages).
Response Final Rejection and Request for Continued Examination was dated Mar. 25, 2019 to the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (13 Pages).
Notice of Allowance was dated Apr. 17, 2019 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (8 Pages).
Issue Notification was issued on Aug. 14, 2019 by the USPTO for U.S. Appl. No. 14/846,032, filed Sep. 4, 2015 and granted as U.S. Pat. No. 10,400,118 on Sep. 3, 2019 (Applicant-Plastipak Packaging, Inc.) (1 Page).
Office Action dated Apr. 28, 2020 by the EP Patent Office for EP Application No. 16 842 898.5, filed on Aug. 31, 2016 and published as EP 3341209 A1 on Jul. 4, 2018 (Applicant—Plastipak Packaging, Inc.) (5 pages).
Office Action dated Jul. 14, 2020 by the Australian Patent Office for AU Application No. 2016315778, filed on Aug. 31, 2016 (Applicant—Plastipak Packaging, Inc.) (6 pages).
Examination Report dated Feb. 17, 2021 by the European Search Authority for EP Application No. 16842898.5, filed on Aug. 31, 2016 and published as EP 3341209 A1 on Jul. 4, 2018 (Applicant—Plastipak Packaging, Inc.;) (5 pages).

* cited by examiner

| ADHESION SCORE | TEST 1 | TEST 2 | TEST 3 | TEST 4 |
|---|---|---|---|---|
| 9 | PASS | PASS | PASS | PASS |
| 8 | FAIL | PASS | PASS | PASS |
| 7 | PASS | PASS | PASS | FAIL |
| 6 | FAIL | PASS | PASS | FAIL |
| 5 | PASS | PASS | FAIL | FAIL |
| 4 | FAIL | FAIL | FAIL | FAIL |
| 3 | FAIL | FAIL | PASS | PASS |
| 2 | FAIL | FAIL | PASS | FAIL |
| 1 | FAIL | FAIL | FAIL | FAIL |

FIG. 2

METHODS AND COMPOSITIONS FOR DIRECT PRINT HAVING IMPROVED RECYCLABILITY

CROSS-REFERENCE TO RELATED APPLICATIONS

This application is a continuation of U.S. patent application Ser. No. 14/846,032, filed Sep. 4, 2015, which is a continuation-in-part of U.S. patent application Ser. No. 14/528,324, filed Oct. 30, 2014, and now issued as U.S. Pat. No. 9,150,325, which is a divisional of U.S. patent application Ser. No. 13/168,181, filed Jun. 24, 2011, and now issued as U.S. Pat. No. 8,876,979, which claims priority from U.S. Provisional Patent Application No. 61/360,512, filed Jul. 1, 2010, and further is a continuation-in-part of U.S. patent application Ser. No. 12/581,952, filed Oct. 20, 2009, which claims priority from U.S. Provisional Application No. 61/106,860, filed Oct. 20, 2008, all of the foregoing are hereby incorporated by reference as though fully set forth herein.

TECHNICAL FIELD

The present invention relates generally to ink compositions for digital printing on external surfaces of plastic articles. The present invention also relates to plastic articles having digital images printed thereon, including plastic containers having digital images with improved adhesion and/or recycling characteristics, as well as methods for facilitating the recycling thereof.

BACKGROUND

The plastic container industry continues to employ ever increasing amounts of recycling. Container manufacturers have recently started producing containers with digitally printed labels that are of a sufficient definition and quality to compete with and potentially replace prior conventional labeling techniques. Examples of such printing techniques are described in commonly-owned U.S. Pat. Nos. 7,625,059 and 7,736,713, which are incorporated herein in their entirety by reference.

Potential challenges arise when introducing containers with digitally printed labels into conventional container recycling processes. Some challenges have been mentioned and discussed in U.S. patent application Ser. No. 12/581,952, which is also incorporated herein in its entirety by reference. There is a clear trend amongst container manufacturers, brand owners, end users, and governmental entities to improve and increase plastic container recycling efforts. Consequently, it is desirable to provide industry-acceptable articles that are sufficiently compatible with the current recycling infrastructure and processes, or that provide sufficient incentive and/or volumes to effectuate industry-wide changes. At least initially, it would be desirable to provide digitally printed articles that are recyclable using current industry standard processes—i.e., processes that commonly include caustic high-temperature washing and grinding. As such, there is a desire for digitally printed plastic articles, such as containers, that have digital images that adhere to the article without quality issues throughout its useful life, but are more readily removable during plastic recycling processes.

SUMMARY

In an exemplary aspect, an ink composition for digital printing onto a plastic article is disclosed. The ink composition generally comprises a base ink; an ink removal-promoting additive; and a carrier capable of dissolving at least a portion of the ink removal-promoting additive. The removal-promoting additive is configured or selected to cause at least a portion of cured droplets of ink to separate or loosen from the external surface of a plastic article when a printed digital image is exposed to a liquid-based (e.g., water-based) solution at or about a predetermined elevated temperature. Such predetermined elevated temperature may, without limitation, include those associated with conventional recycling processes.

In another aspect, a recyclable plastic article is disclosed that has an external surface with a digital image printed thereon by cured droplets of ink. The droplets of ink comprise a composition of ink as summarized above that includes a removal-promoting additive. Embodiments of methods for the removal of said ink from a plastic container and methods for facilitating such recycling are also disclosed.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Embodiments of the invention will now be described, by way of example, with reference to the accompanying drawings, wherein:

FIG. 2 is general representation of a quality review table/matrix that may be used to evaluate the acceptability of a printed image on a plastic article.

DETAILED DESCRIPTION

Figure 1:
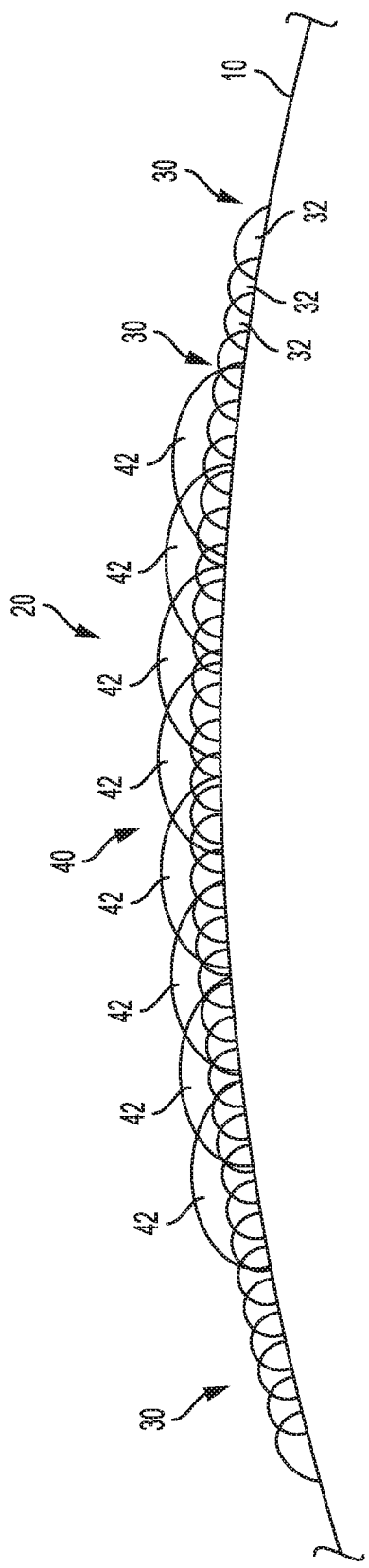
FIG. 1 generally illustrates a side view of a portion of a plastic container with an embodiment of a digital image printed thereon.

In various aspects, reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

For general context, and without limitation, a portion of a surface 10 of a plastic article (e.g., a container) with an embodiment of a printed image 20 is generally illustrated in FIG. 1. The illustrated embodiment of the image 20 includes a base coat 30 that may be comprised of a plurality of base coat ink droplets 32, and may also include a secondary coat 40 that can be comprised of a plurality of secondary coat ink droplets 42.

Containers (which include bottles) associated with the present disclosure are comprised of a plastic material or resin (e.g., acrylonitrile-butadiene-styrene (ABS), polyethylene terephthalate (PET), polystyrene (PS), polyethylene (PE)(including high-density polyethylene (HDPE)), polypropylene (PP), polyvinyl chloride (PVC), etc.). Further, the containers may be mono-layer or multi-layer containers, and can be formed using various conventional forming techniques including, without limitation, injection molding, blow molding, thermoforming, etc. In an embodiment, the outermost layer/surface may be comprised of a virgin plastic material. Although, it is noted that containers in accordance with the teachings of the disclosure may also include some percentage of recycled content, including a percentage of recycled content in the outer layer of the container.

In embodiments, the article (e.g., container) may include a first coat, or base coat (e.g. base coat 30 shown in FIG. 1). The base coat 30 may be comprised of a plurality of base coat ink droplets 32 that are printed (e.g., digitally printed, such as by a drop-on-demand ink jet process) on an exterior surface of the article and are subsequently cured or permitted to cure. The ink may be UV curable ink, which is curable by UV radiation that can be applied by various known means, including but not limited to UV or LED lamps. The ink droplets may be monomer-based and comprised of an ink composition that serves to improve the application of the ink droplets (e.g., provides good processing characteristics for printing) and/or provides a visual characteristic (e.g., color or texture). For embodiments, the base coat 30 may comprise white and/or colorless portions. Moreover, with disclosed ink droplets, i.e., those that are monomer-based, curing can cause the ink droplets to polymerize. Because the inks that are employed are not solvent-based, the ink can be composed so that during recycling processes the ink does not bleed in solutions and give off volatiles, as solvents might. It is noted that the U.S. Environmental Protection Agency (EPA) has promulgated guidelines for solvents; however, polymers are solid and do not flash off or give off volatiles. That is, the separation of inks such as disclosed herein can be mechanical in nature, as the ink is in a cured polymer state and may be a physically removed (e.g., in the form of flakes or film), rather than being included as part of a chemical dissolution.

As summarized above, the ink composition that makes up the ink droplets includes a removal-promoting additive. In some aspects, the "removal-promoting additive" comprises at least one hydrophilic component or acidic component. Hydrophilic components may comprise one or more composition elements that exhibit hydrophilic (water-loving) properties. Acidic components may comprise one or more composition elements that exhibit acidic properties. For some embodiments, the removal-promoting additive will comprise a combination of hydrophilic and acidic components—i.e., at least two removal promoting additives. For some ink droplet compositions a "dual" composition, in which the removal-promoting additive comprises both hydrophilic and acid components, a lesser percentage of weight (to total) may be used to provide comparable results to the use of composition with just a single additive.

Such hydrophilic components may include hydrophilic monomers, hydrophilic oligomers, and water dispersible monomers that provide the desired functionality. Hydrophilic monomers are often characterized as having oxygen or nitrogen atoms, in addition to halogens, in their backbone structure. Such monomers are commonly prone to attack by polar solvents such as water and ketones. Hydrophilic monomers also tend to have a lesser resistance to thermal degradation. Consequently, the inclusion of one or more hydrophilic components in the associated ink droplets can, at a later point (such as the point of post-use recycling), improve the separation of the image (i.e., the cured ink droplets) from the plastic structure of the article. By way of example and without limitation, in a cured state, the hydrophilic portion of a polymer will typically absorb water. When this occurs, the water may act as a plasticizer, increasing the mobility of the polymer's chains. The increased mobility can soften the polymer, making it more susceptible to removal. As such, the exposure of a plastic article, such as a container, including an image comprised of an ink composition with a removal-promoting additive (e.g., hydrophilic monomer) to a liquid-based solution (e.g., agitated water) at an elevated temperature will promote the softening of the ink composition (i.e., hydrophilic monomer) and the separation of the image from the plastic material. The elevated temperature may be predetermined, and may be a temperature that is above the temperature that the article will typically encounter in normal use. Moreover, to the extent desired, an adhesion-separation threshold may be established such that the softening and subsequent removal substantially only occurs at elevated temperatures (e.g., during a recycling process), and is substantially prevented during normal intended use. It is noted that aliphatic urethane acrylates are a general class of hydrophilic monomers that generally absorb water and may potentially be used as a hydrophilic component. Moreover, provided that they are appropriately viscous (i.e., not too viscous) for ink jet/digital print application, some hydrophilic oligomers may also be used as a hydrophilic component.

Without limitation, for some embodiments, the removal-promoting additive may include hydrophilic monomers with a percent weight as to the total weight (i.e., of the associated ink and the removal-promoting additive) within the range of near 0% to as much as 20% by weight. For some embodiments, the percent weight of the removal-promoting additive will fall within the range of near 0 to 10% of the total weight. Without limitation, an example of a hydrophilic monomer that may be employed is methoxy polyethylene glycol monoacrylate (e.g., CD 553, commercialized by Sartomer USA, LLC (Sartomer)).

It is noted that some water dispersible monomers are also hydrophilic and appear to absorb water when cured. With such a composition, the water may act as a plasticizer and soften the cured ink composition (e.g., a cured ink film on the surface of a container), making it easier to remove the ink film during recycling processing. With embodiments of the disclosure, the inclusion of an appropriate hydrophilic component to the ink composition can add a hydrophilic quality to the ink, while maintaining the jet-ability and adhesion of the ink to the article substrate throughout the useful life of the article.

Acidic components include acidic monomers that have a measurable acidic value. It is noted that the measurable quantity may be based on pH, acid weight percentage, or titrated value of an alkaline chemical (e.g., mg KOH/g [milligrams of potassium hydroxide per gram of monomer]). Further, for example, in a cured state, the acidic portion of the polymer may be vulnerable to a caustic solution. A reaction between the acidic functionality of the polymer chain and the alkalinity of the solution can yield a decrease in adhesion to the applied substrate, promoting the separation of the polymer. Without limitation, examples of acidic monomers that may be employed include acidic acrylate oligomer (e.g., CN 147, commercialized by Sartomer) and monofunctional acid ester (e.g., CD 9050, commercialized by Sartomer). For instance, when a container involving an acidic component is put into contact with a wash (e.g., a conventional-type caustic wash), associated bonds may be broken, promoting an intended separation of the printed image (droplets of ink) from the plastic substrate.

In other aspects, the removal-promoting additive is configured or otherwise selected according to its desired properties that can facilitate the removal of a cured ink composition from the surface of a plastic article. For example, in one aspect, it is desirable for the removal-promoting additive to exhibit a relatively high solvent solubility and a relatively high aqueous solubility in combination with a glass transition temperature that is below that of the temperature typically utilized in conventional recycling processes. To this end, according to exemplary aspects, the removal-promoting additive exhibits a glass transition temperature (Tg) that is less than about 130° C. This can include removal-promoting additives that exhibit a glass transition temperature (Tg) that is less than about 120° C., less than about 110° C., less than about 100° C., less than about 90° C., less than about 80° C., less than about 70° C., less than about 60° C., or even less than about 50° C. In a further aspect, the ink removal-promoting additive has a glass transition temperature (Tg) in the range of from about 50° C. to about 130° C. In a still further aspect, the ink removal-promoting additive has a glass transition temperature (Tg) in the range of from about 55° C. to about 125° C., or from about 65° C. to about 105° C., or from about 55° C. to about 95° C. In a yet further aspect, the ink removal-promoting additive can have a glass transition temperature (Tg) in any range derived from any of the above exemplary values.

As one of ordinary skill in the art will appreciate, the desired level of aqueous solubility can be characterized as a function of, for example, the acid number of the removal-promoting additive. The acid number can be expressed in terms of a titrated value of an alkaline chemical (e.g., mg KOH/g [milligrams of potassium hydroxide per gram of removal-promoting additive]). In these aspects, the removal-promoting additive can exhibit an acid number in the range of from about 100 mg KOH/gm to about 250 mg KOH/gm, including values of 110 mg KOH/gm, 120 mg KOH/gm, 130 mg KOH/gm, 140 mg KOH/gm, 150 mg KOH/gm, 160 mg KOH/gm, 170 mg KOH/gm, 180 mg KOH/gm, 190 mg KOH/gm, 200 mg KOH/gm, 210 mg KOH/gm, 220 mg KOH/gm, 230 mg KOH/gm, and 240 mg KOH/gm. In a further aspect, the ink removal-promoting additive has an acid number in the range of from about 150 mg KOH/gm to about 205 mg KOH/gm, including values of 175 mg KOH/gm, 185 mg KOH/gm, and 195 mg KOH/gm. In a still further aspect, the ink removal-promoting additive can have an acid number in any range derived from any of the above exemplary values.

In further aspects, the removal-promoting additive can exhibit a glass transition temperature (Tg) that is less than about 100° C. and an acid number in the range of from about 100 mg KOH/gm to about 250 mg KOH/gm. In a still further aspect, the ink removal-promoting additive can exhibit a glass transition temperature (Tg) in the range of from about 50° C. to about 90° C. and an acid number in the range of from about 150 mg KOH/gm to about 205 mg KOH/gm. In a yet further aspect, the ink removal-promoting additive can have a glass transition temperature (Tg) and an acid number in any range derived from any of the above exemplary values.

By selecting a removal promoting additive that exhibits a desired combination of aqueous solubility and glass transition temperature, it is possible to provide a curable ink that exhibits desired adhesion, scratch resistance, and solvent resistance while also facilitating the removal process of the ink as a precursor to a recycling process. When subjected to a caustic aqueous environment at a temperature that exceeds the Tg of the removal-promoting additive, a softening of additive can result thus leading to a relatively cleaner detachment of the cured ink layer from the surface of the plastic it was printed on.

These removal-promoting additives can be present in the ink compositions in an amount from about 1 to about 20 weight percent of the ink composition. This can further include specific exemplified amounts of 2, 3, 4, 5, 6, 7, 8, 9, 10, 11, 12, 13, 14, 15, 16, 17, 18, and 19 weight percent. In a further aspect, the ink removal-promoting additive can be present in an amount any range of amounts derived from any of the above exemplary values. For example, the removal-promoting additives can be present in the ink compositions in an amount from about 5 to about 20 weight percent of the ink composition.

In an exemplary aspect, ink removal-promoting additives that exhibit the above combination of aqueous solubility and relatively low glass transition temperature include the styrene maleic anhydride resins. In a still further aspect, the styrene maleic anhydride resins can be a copolymer of styrene maleic anhydride copolymer. In a yet further aspect, the styrene maleic anhydride is esterified styrene maleic anhydride. Exemplary non-limiting commercially available styrene maleic anhydride resins that are suitable for use as a removal-promoting additive are the Cray Valley SMA®3840 and SMA®1440F resins from Total.

In further aspects, the ink composition that makes up the ink droplets also comprises a carrier capable of solubilizing and dissolving at least a portion of the ink removal-promoting additive. The carrier can be monomer based or solvent based. Exemplary monomers that can be used as a carrier include the class of acrylic monomers. In an exemplary aspect, suitable acrylic monomers can include 1,3-butylene glycol diacrylate, 1,6-hexanediol diacrylate, 1,3-butylene glycol dimethacrylate, isobornyl acrylate, or isodecyl methacrylate, or a combination thereof. In some aspects, the acrylic monomer is selected from 1,3-butylene glycol diacrylate, 1,6-hexanediol diacrylate, and 1,3-butylene glycol dimethacrylate. As noted above, in aspects the carrier capable of solubilizing the removal-promoting additive can be solvent based. Suitable solvents can, in some aspects, be aprotic solvents or aqueous based solvents. Specific but non-limiting examples of suitable solvent carriers include N-methyl-2-pyrrolidone (NMP) and acetone.

The carrier component can be present in the ink compositions in an amount from about 1 to about 20 weight percent of the ink composition. This can further include specific exemplified amounts of 2, 3, 4, 5, 6, 7, 8, 9, 10, 11, 12, 13, 14, 15, 16, 17, 18, and 19 weight percent. In a further aspect, the carrier can be present in an amount any range of amounts derived from any of the above exemplary values. For example, the carrier can be present in the ink compositions in an amount from about 5 to about 15 weight percent of the ink composition.

The base ink portion of the ink composition can be any conventionally known curable ink, such as conventional UV curable ink. The base ink can be present in the ink composition in an amount in the range of about 50 to about 85 weight percent of the ink composition, including exemplary weight percent values of 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, and 84 weight percent. In a further aspect, the base ink can be present in any range of amounts that is derived from any of the above exemplary values. For example, base ink can be present in the ink compositions in an amount from about 65 to about 85 weight percent of the ink composition.

In one exemplary aspect, disclosed herein is a ink composition, comprising: (a) from about 65 to about 85 weight percent of the base ink; (b) from about 5 to about 20 weight percent of the ink removal-promoting additive having a glass transition temperature less than about 100° C.; and (c) from about 5 to about 15 weight percent of the carrier capable of dissolving at least a portion of the ink removal-promoting additive. According to this exemplary aspect the base ink can be a base UV white ink, the ink removal promoting additive can be styrene maleic anhydride resin, and the carrier can be solvent based and can comprise N-methyl-2-pyrrolidone (NMP), or acetone, or other acceptable solvent.

As described herein, disclosed are recyclable plastic articles comprising digitally-printed image printed directly on the curved external surface, the image comprising cured droplets of an ink composition as previously described herein. In a further aspect, an exemplary recyclable plastic article comprises a curved external surface with a digitally-printed image printed directly on the curved external surface, the image comprising cured droplets of ink, and the droplets of ink comprising a composition including an ink removal-promoting additive having a glass transition temperature less than about 100° C. In a still further aspect, the digitally-printed image has an adhesion score of at least 6.0 and up through 9.0, and the removal-promoting additive is configured to cause the cured droplets of ink to separate or loosen from the curved external surface of the article when the digitally-printed image is exposed to the basic solution at an elevated temperature of at least about 70° C.

In a further aspect, the article comprises a plastic container. In a still further aspect, the plastic container is a bottle. In a yet further aspect, the plastic container is comprised of one or more of the following materials: polyethylene, polyethylene terephthalate, high density polyethylene, and polypropylene.

In a further aspect, the removal-promoting additive present in the ink composition is configured to cause the cured droplets of ink to separate or loosen from the curved external surface of the article when the digitally-printed image is exposed to an a liquid based solution, such as an aqueous or water based solution, at a predetermined elevated temperature. For example, the cured droplets of ink can separate or loosen from the curved external surface of the article when the digitally-printed image is exposed to a basic solution having a pH of at least about 10, 11, 12, or 13 and an elevated temperature in the range of from about 70 to 90° C. In a further aspect the basic solution has a pH in the range of from about 12-13. According to aspects, after exposure to the basic solution at the elevated temperature for a sufficient period of time, at least about 90 weight percent of the cured ink droplets separate from the curved external surface of the article. In a yet further aspect, the digitally-printed image includes a base coat including a plurality of cured base coat ink droplets, and a secondary coat including a plurality of cured secondary coat ink droplets, the secondary coat being applied to at least a portion of the base coat.

By way of example, and without limitation, an embodiment of a polyethylene terephthalate (PET) container including UV-cured printed ink having a blended removal-promoting additive was subjected to ink-removal testing. The blended removal-promoting additive of the tested containers included acidic monomers of the type noted above, i.e., acidic acrylate oligomer and/or monofunctional acid ester. The containers may be subjected to a bath solution comprising a pH level of at least 9.0, which can assist label removal as generally known in the art of plastic container recycling, with the solution being heated to approximately 85° C. Various samples were exposed to such conditions for 12 minutes, and were evaluated on a scale of 0 to 5 as follows:

0—No improvement in removal relative to the control sample

1—Minimal improvement observed, removal obtained in only some areas through abrasion with a metal object 2—Some improvement observed, the entire film could be removed by scratching with a metal object 3—Cured ink film was removable by scratching with a fingernail 4—Cured ink film was easily removable simply by wiping with a clean wipe 5—Cured ink film fell off during wash test.

The testing was intended to, among other things, identify solutions that provided a removal performance level of 4 or 5. However, a level of at least 4 is not necessarily a requirement, and for some applications a lower removal level may also be acceptable. The results of the testing indicated that the inclusion of the removal-promoting (acidic) additives blended into the ink composition provided a significant improvement in the removal of the cured ink from the plastic (PET) material. While both forms of acidic additives exhibited an improvement promoting ink removal, with the instant test configuration, a somewhat lesser compositional percentage of the acidic acrylate oligomer, as opposed to the monofunctional acid ester (10% versus 15%, respectively), was used to obtain at least a level 4 removal level.

In embodiments, the ink composition may optionally include a hydrophobic component. That is, the ink composition may, for example, include hydrophilic and hydrophobic components. Hydrophobic components may include hydrophobic (water-hating) monomers. The hydrophobic properties generally relate to polarity. A number of hydrophobic monomers are characterized as having an organic backbone structure composed primarily of hydrogen and carbon; and thus, such monomers tend to be non-polar and offer resistance to polar solvents (such as water and alcohols), as well as to acids and bases. For such dual-component embodiments, the ink composition should strike a balance between the hydrophilic and hydrophobic components (e.g., hydrophilic monomers and hydrophobic monomers). The hydrophobic monomers may help keep the ink drops adhered to the article substrate, and the hydrophilic monomers may help soften (and even separate) when the image is exposed to a recycling process/bath (e.g., agitated water at an elevated temperature).

For an embodiment of a container with an image printed thereon, at least a first base coat 30 (which may include a hydrophilic component) may be applied to a surface of a container at a first time $t_1$ and at a first temperature $T_1$. The temperature $T_1$ will be in the range of temperatures that are appropriate for application of the associated base coat. In an embodiment, the base coat 30 may be curable (e.g., ultraviolet (UV) curable), and further may be cured prior to an application of a secondary coat.

For some embodiments, a secondary coat 40 may be comprised of a plurality of secondary coat ink droplets 42 that are distributed on at least a portion of the base coat 30. Further, if desired, additional layers of "secondary" coats (e.g., a tertiary layer, etc.) may also be applied on the secondary coat 40. With embodiments of the disclosure, the secondary coat ink droplets 42 may also be comprised of an ink composition including a hydrophilic component.

A plurality of secondary coat ink droplets 42 may collectively form a part of an application pattern which, in turn, may form all or a portion of an image. Furthermore, as generally illustrated in FIG. 1, portions of one or more adjacent secondary coat ink droplets 42 may overlap or intermix with each other. The secondary coat 40, and the constituent secondary coat ink droplets 42, may comprise various known colors, including without limitation, primary printing colors such as cyan, magenta, and yellow. Further, controlling the overlapping of or combinations of certain colors in certain areas can provide additional "process" colors. Additionally, the secondary coat ink droplets 42 may be curable. For example, UV curable secondary coat ink droplets may comprise all or a portion of the intended image. Where curing is accomplished by radiation, the ink composition may include a photo initiator. It is additionally noted that cured ink on a container surface may be primarily held by two bonds—i.e., a polar bond between the ink polymer and the plastic, and a mechanical bond due to the plastic surface having an uneven surface at a microscopic level (e.g., microstructures). For a number of embodiments of the present disclosure, it is best to attack both bonds. For some applications, a hydrophilic component may work better on mechanical bonds, while an acidic component may work better on polar bonds. Depending upon the application, the secondary coat ink droplets can vary in diameter, which can range, for instance, from about 10 microns to about 200 microns. The secondary coat 40 may be applied to a surface 10 of a container at a second time $t_2$ and at a second temperature $T_2$, wherein the second temperature $T_2$ at which the secondary coat 40 is applied is typically less than the first temperature $T_1$ at which the base coat 30 is applied.

In embodiments of the invention, the time between application of a base coat and the application of a secondary coat (e.g., $t_2$ minus $t_1$) may be reduced—for example, to as little as ten seconds or less. For some embodiments, the application time differential will be within two to six seconds. Moreover, in embodiments, the application temperature differential between the temperature at which the base coat 30 is applied and the temperature at which a secondary coat 40 is applied to a portion of the base coat 30, i.e., $T_1$ minus $T_2$, may be controlled to be equal to or less than about 10° F. For some embodiments, the application temperature differential will be within about 5° F. to about 10° F. Moreover, for some applications, it may be desirable to modify the temperatures associated with the application of the base coat 30 and the secondary coat 40 so that the respective application temperatures are closer together—i.e., so that the temperature differential between the applied coats is reduced or minimized. This can be accomplished, for instance, by (a) lowering/decreasing $T_1$, (b) raising/increasing $T_2$, or (c) a combination of (a) and (b). Such aforementioned time and/or temperature control with respect to the base coat and secondary coat can provide for better adhesion of the resulting printed image with respect to the article.

It is noted that in addition to time and temperature, irradiance is a factor that can also affect the effective cure rate for a printed image. That is, with certain times (e.g., $t_1$ and $t_2$) and temperatures (e.g., $T_1$ and $T_2$), there may be an associated Irradiance—i.e., $\varepsilon_1$ and $\varepsilon_2$. For example, in embodiments a base coat may be cured at irradiance $\varepsilon_1$, and an associated secondary coat may be cured at irradiance $\varepsilon_2$. Further, in embodiments, the effective cure rate—which may be based on a combination of time, temperature, and irradiance—the irradiance may generally be provided by the following equation:

$$\text{Irradiance}(\varepsilon) = (d\Phi/dA)$$

where, $\Phi$=irradiant flux (measured in watts), and A=area ($cm^2$)

For example, without limitation, the range of irradiance for some embodiments will be between about 0.1 watts/$cm^2$ and about 10.0 watts/$cm^2$.

For some applications, such as where a curable ink (e.g., a UV-curable or radiation-curable ink) is used, the relevant coat or ink may be cured after each respective print station. For example, without limitation, an embodiment of a process may, at least in part, comprise: application of base coat; cure step; application of secondary coat; and cure step. Alternatively, also by way of example and without limitation, the process may, at least in part, comprise: application of base coat; cure step; application of base coat; cure step; application of secondary coat, and cure step.

Moreover, for embodiments of the invention, it can be desirable for the production/subsequent handling rate of containers/bottles to match or substantially match the flow/processing rates of the associated printing machine(s).

Further, it has been found that the quality of printed images may be, at least in part, controlled and/or improved through one or more of the following techniques:

(a) selection and/or calibration of ink sets;

(b) control of substrate (i.e., container surface) temperature; and/or (c) timing control.

With respect to the selection and/or calibration of ink sets, this is accomplished, at least in part, by the selection and/or calibration of the inks comprising the base and secondary coats. It has been discovered that the inks used can be selected to provide desired time and/or temperature characteristics, including relative to one another in combination. For example, selection of certain inks having given viscosities can exhibit or provide certain desired temperature related effects.

With regard to the control of the substrate (i.e., container surface) temperature, the temperature of a relevant portion of a sidewall (or other portion of a container) can be treated or controlled to some measure. For example a given portion of the container can be pre-treated. Such pre-treatment can be facilitated using various known techniques that may include, without limitation, flame, corona, and plasma treatment. However, the invention is not limited to those specific pre-treatment techniques.

With respect to timing control, the time associate with the movement of containers, for instance through a production machine, as well as the timing of the applications of the base coat and/or secondary coat, can be controlled. It can be desirable for the production/subsequent handling rate of containers/bottles to match or substantially match the flow/processing rates of the associated printing machine(s).

The present disclosure may also include a system for assessing or evaluating the "acceptability," such as the commercial acceptability, of a container having a printed image—such as a digitally printed label. That is, for embodiments of the invention, the system for assessing or evaluating can provide an "adhesion score." FIG. 2 generally represents a quality review table/matrix that can be used to assess or evaluate the acceptability of a printed image on a container. As generally shown, the Y-axis may involve numbers associated with an overall pass-or-fail score. In the illustrated embodiment, numbers 1 through 5 indicate that the containers are not acceptable, while numbers 6 through 9 indicate that the associated containers are acceptable. It is important to note that while a score of at least a 6 will "pass"

as acceptable with respect to the instant table/matrix, the invention is not limited to the specific table/matrix shown and, alternatively, more scores could be provided for and/or the passing score could be raised or lowered as desired or necessary. A plurality of tests—which may include various standard tests, including those previously noted—are represented in the columns provided on the X-axis. For example, without limitation, Test 1 may include a "Sutherland Rub Test," Test 2 may comprise a "3M #610 Tape Test," Test 3 may include a "Simulated Ship Test," and Test 4 may comprise a "3M #810 Tape Test." As generally shown in the table, various pass-or-fail designations may be represented on the table in connection with each noted Test. With respect to several of the aforementioned "standard" tests, the tests may be modified as appropriate for use in connection with a printed image as opposed to a traditionally applied label. For instance, with various "tape" tests, which may follow the ASTM D 3359-08 standards, the tests associated with the table/matrix may or may not involve the cutting of the image portion with a cutting tool prior to applying a pressure sensitive tape. That is, in an embodiment, "Test 2" may involve a "modified" 3M #610 Tape Test in so far as the portion of the image portion of a container that is subjected to testing may not be cross-cut or otherwise separated from the container. Moreover, with the table set forth in FIG. 2, an indication of a "pass," with respect to tape tests directly practicing the modified ASTM standard (i.e., the test does not involve cross-cutting/separation) would generally be represented by any removed portions being no larger than 2.0 mm$^2$. With respect to tape tests directly practicing the ASTM standard, an indication of "pass" would generally be a classification "4B" or "5B" (under the ASTM FIG. 1 Classification of Adhesion Test Results), or would involve less than 5% of the printed area removed.

In an embodiment, it is desirable to provide a container with a printed image (e.g., digitally printed image) that, at a minimum, passes a modified 3M #610 tape test and is nonetheless "recyclable." A digital image that is printed on a container is considered to be "recyclable" if it would achieve less than a "4B" classification (i.e., 5% of more of the area is removed) employing an ASTM D 3359 standard #810 tape test. A container with a digital image that passes Test 2 (modified 3M #610 Tape Test) and Test 3 (Simulated Ship Test), yet fails Test 4 (3M #810 Tape Test), would achieve an adhesion score of either 6.0 or 7.0. Such a container with a printed image having an adhesion score of 6.0 or 7.0 is commercially suitable for shipment (i.e., passing a Simulated Ship Test) while providing an adhesion associated with the printed image that is sufficient for normal/intended use but is favorably separable for subsequent recycling. Stated differently, the adhesion associated with the configured digital image is sufficiently strong for intended use but does not impede separation during recycling.

With respect to such a table/matrix, each test may be conducted on an adequate (e.g., statistically significant or representative) sampling of containers. After all tests are completed, results may be tabulated and entered into the table/matrix, to provide an "adhesion" score. The associated score outcomes can then be correlated.

Among other things, the teaching of the present disclosure can provide for improved recyclability. Recycling inks printed on various articles in an effective manner can provide a number of cost and efficiency benefits, as well as providing benefits to the environment. For example, without limitation, containers with digitally printed images (which may be formed by cured UV or radiation curable ink) that are comprised, at least in part, of an ink composition including a hydrophilic and/or an acidic component can be conveniently removed in connection with conventional plastic recycling processes. Industry standard recycling process of plastic containers conventionally include grinding containers into granulated plastic flakes, subjecting these flakes to a high-heat caustic wash process, drying the cleaned flakes, sorting, and extruding into resin pellets for resale. With embodiments that embody aspects of the disclosed teachings, digital image on the container may remain with the resin flakes after the grinding process, the digital image will be substantially separated from the resin flakes during the high-heat caustic wash process, which may be agitated, and thereby not contaminating the clean resin flakes to be formed into resin pellets.

With separation techniques, there are at least four methodologies that can be Employed—alone or in various combinations—to attack polar and/or mechanical bonds to promote the removal of the ink from the article. The techniques include those using: (1) water or liquid-based solutions (e.g., for additives with hydrophilic components or having the desired Tg and acid numbers as described herein); (2) caustic components (e.g., for additives with acidic components or the desired combination of Tg and acid number as described herein)—i.e., chemical reactions may be used to release polar bonds; (3) heat or temperature; and/or (4) mechanical force (e.g., high pressure spray (psi)); or any combinations thereof.

The disclosure envisions a number of recycling processes that may be used to remove the ink from the article. For example, one embodiment of a method for recycling plastic containers comprises: providing a plastic container having a digital image, the ink composition including a removal-promoting additive (e.g., a hydrophilic or acidic component); and exposing the digital image to a liquid-based solution—e.g., water with or without a caustic component)—at an elevated temperature; optionally agitating the solution. Before or after the exposure, the container may be subject to a grinding operation. Similar embodiments may be said to be along the lines of including dry grind, elutriate, wash, dry, and elutriate.

Another process, which may be more similar to conventional industrial recycling and is commercially available (for example, from SOREMA (Italy)), may be said to involve a single wash, wet grinding, centrifuge, sorting, and float tank/separation. A "single wash" may, for instance, be employed by having bottles conveyed (e.g. by a set screw or multi-screw system) through a high-pressure wash (e.g., a high-temperature caustic wash). This can add a mechanical force component to assist with label removal. Typically, the bottles are whole—that is, not ground prior to such a wash. Materials, including polymerized inks, may be washed away and fall into a collection or grating system below the conveying mechanism.

In a further aspect, the present disclosure provides a method for removing cured ink from a plastic container, the method comprising: (a) providing a plastic container having a curved external surface with a digital image printed directly on the curved external surface of the plastic container by a drop-on-demand ink jet printing process, the image comprising cured droplets of ink applied directly to the curved external surface of the plastic container and having an adhesion score of at least 6.0 and up through about 9.0, and the droplets of ink comprising a composition including an ink removal-promoting additive having a glass transition temperature less than about 100° C.; (b) exposing at least a portion of the digitally printed image of the plastic container to a basic solution at an elevated temperature of at least about 70° C.; and (c) removing at least a portion of the digitally printed image from the curved external surface on which the image was printed.

In a further aspect, the plastic container is a bottle. In a still further aspect, the plastic container is comprised of one or more of the following materials: polyethylene, polyethylene terephthalate, high density polyethylene, and polypropylene.

In a further aspect, the ink removal-promoting additive comprises a styrene maleic anhydride copolymer. In a still further aspect, the ink removal-promoting additive has a glass transition temperature (Tg) in the range of from about 50° C. to about 130° C. In a yet further aspect, the ink removal-promoting additive has a glass transition temperature (Tg) in the range of from about 65° C. to about 110° C. In a still further aspect, the ink removal-promoting additive has a glass transition temperature (Tg) in the range of from about 55° C. to about 65° C. In an even further aspect, the ink removal-promoting additive has an acid number in the range of from about 150 mg KOH/gm to about 205 mg KOH/gm. In a still further aspect, the ink removal-promoting additive has an acid number in the range of from about 165 mg KOH/gm to about 205 mg KOH/gm.

In a further aspect, the basic solution is an aqueous solution having a pH in the range of about 12-13 and wherein the elevated temperature is in the range of from about 70 to 90° C. In a still further aspect, the step of removing includes scratching or wiping the ink from the container after exposure of the image to the basic solution. In a yet further aspect, the ink is mechanically removed in the form of flakes or film.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

A. EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In the following exemplary examples, various ink compositions according to the present disclosure were prepared and tested for use in direct printing on an external surface of a plastic article. The ink compositions can be prepared by first dissolving the ink removal-promoting additive in the carrier, and then adding the carrier solution to a base ink. The prepared ink composition can then be used in direct printing on the external surface of the plastic article.

Performance and recyclability of the various ink compositions on plastic articles were also evaluated. The ink compositions, including UV-curable ink having a removal-promoting additive and a carrier, were direct printed on the surface of a polyethylene terephthalate (PET), polyethylene (PE), and/or high density polyethylene (HDPE) samples and cured.

The cured ink of the sample was then subjected to ink-removal testing, which can include testing of one or more of: adhesion, scratch resistance and solvent resistance properties. The samples can be subjected to various bath solutions which can assist label removal as generally known in the art of plastic container recycling, for example, a bath solution comprising a pH level of at least 9.0 and with the solution being heated to approximately 75° C. or 85° C. The testing was performed at time periods including immediately after treatment (imm) and at 1 hour (1 hr) after treatment.

The materials shown in Table 1 were used to prepare the compositions described and evaluated herein.

TABLE 1

| Item | Description | Supplier |
| --- | --- | --- |
| Luwax S | Montanic acid wax | BASF |
| Luwax V | Polyether wax | BASF |
| Joncryl 538A | Acrylic emulsion | BASF |
| Joncryl 611 | Acrylic resin | BASF |
| Joncryl 682 | Acrylic resin | BASF |
| Michem Flex R 1924 | Water based print receptive primer | Michelman, Inc |
| BYK111 | Acidic copolymer additive | Altana |
| CITRIC Acid | Citric acid | Sigma Aldrich |
| DURACOTE | Cold End Coating | Sun Chemical |
| Ceraflour 998 | PTFE modified polyethylene wax | Altana |
| SMA1440 | styrene maleic anhydride copolymer | Cray Valley USA, LLC |
| SMA3840 | Styrene maleic anhydride copolymer | Cray Valley USA, LLC |
| NMP | N-methyl-2-pyrrolidone | Sigma Aldrich |

1. Example 1

For the following example, the removal-promoting additives of the tested samples were waxes and resins. The carrier was acetone or N-methyl-2-pyrrolidone (NMP) (commercially available from Sigma Aldrich). The inventive ink formulations and performance data are provided in Tables 2-5 below. For the following data, "pass" indicates that no ink removal was observed, and "fail" indicates that significant and/or complete ink removal was observed. Any % value listed corresponds to the observed % ink removal.

TABLE 2

| | | | | | imm | 1 hr | 1 hr |
| | | | | | | ambient water soak | |
| Formulation | Caustic Test Score | scratch | 610 tape | 810 tape | scratch | scratch | 610 tape |
| --- | --- | --- | --- | --- | --- | --- | --- |
| Luwax S (A) | NA | fail | fail * | fail * | fail | fail | fail |
| Luwax S (B) | NA | fail | fail * | fail * | fail | fail | fail |
| Luwax V (A) | NA | fail | fail * | fail * | fail | fail | fail |
| Luwax V (B) | NA | fail | fail * | fail * | fail | fail | fail |
| Joncryl 538A (A) | NA | pass | pass | fail | fail | pass | fail |

TABLE 2-continued

| Formulation | | | | | | | | |
|---|---|---|---|---|---|---|---|---|
| Joncryl 538A (B) | NA | pass | pass | fail | fail | pass | 20% fail | |
| Joncryl 611 (A) | NA | fail | pass | 50% fail | fail | pass | 40% fail | |
| Joncryl 611 (B) | NA | fail | pass | 50% fail | pass | fail | fail | |
| Joncryl 682 (A) | NA | pass | pass | 70% fail | fail | fail | fail | |
| Joncryl 682 (B) | NA | fail | pass | 70% fail | fail | pass | fail | |
| Michem (A) | NA | pass | pass | pass | fail | pass | pass | |
| Michem (B) | NA | pass | pass | pass | fail | pass | pass | |
| Control | 0 | fail | fail | fail | fail | fail | fail | |
| Luwax S (A) | NA | fail | fail | fail | fail | fail | 50% fail | |
| Luwax V (A) | 3 | fail | fail | fail | fail | fail | fail | |
| Luwax V (B) | 3 | slight | 50% fail | fail | fail | fail | fail | |
| Joncryl 538A (A) | 1 | slight | pass | Fail | fail | pass | fail | |
| Joncryl 538A (B) | NA | slight | pass | pass | fail | pass | fail | |
| Joncryl 611 (A) | 1 | slight | pass | pass | fail | pass | fail | |
| Joncryl 611 (B) | 1 | fail | pass | pass | fail | 50% fail | fail | |
| Joncryl 682 (A) | 1 | slight | pass | fail | fail | fail | fail | |
| Joncryl 682 (B) | 2 | pass | pass | 50% fail | fail | pass | fail | |
| Michem (A) | 0 | pass | pass | pass | fail | pass | pass | |
| Michem (B) | 0 | pass | pass | pass | fail | pass | pass | |
| Control (A) | 0 | slight | pass | 50% fail | pass | pass | fail | |
| Control (B) | 0 | slight | pass | 50% fail | fail | 50% fail | fail | |

| | imm | 1 hr | 1 hr | imm | 1 hr | imm | imm | 1 hr | imm |
|---|---|---|---|---|---|---|---|---|---|
| | ice water soak | | | 75C water soak | | | 75C Caustic soak | | |
| Formulation | scratch | scratch | 610 tape | scratch | scratch | 610 tape | scratch | scratch | 610 tape |
| Luwax S (A) | fail | fail | fail | fail | fail | part fail | NA | NA | NA |
| Luwax S (B) | fail | fail | fail | fail | fail | part fail | NA | NA | NA |
| Luwax V (A) | fail | fail | fail | fail | fail | part fail | NA | NA | NA |
| Luwax V (B) | fail | fail | fail | fail | fail | part fail | NA | NA | NA |
| Joncryl 538A (A) | pass | pass | 50% fail | fail | fail | fail | NA | NA | NA |
| Joncryl 538A (B) | pass | pass | 50% fail | fail | pass | fail | NA | NA | NA |
| Joncryl 611 (A) | fail | fail | 30% fail | fail | fail | 60% fail | NA | NA | NA |
| Joncryl 611 (B) | fail | fail | 50% fail | fail | pass | 40% fail | NA | NA | NA |
| Joncryl 682 (A) | pass | pass | pass | pass | fail | fail | NA | NA | NA |
| Joncryl 682 (B) | pass | pass | 30% fail | fail | fail | fail | NA | NA | NA |
| Michem (A) | pass | pass | pass | pass | fail | 30% fail | NA | NA | NA |
| Michem (B) | pass | pass | pass | pass | pass | pass | NA | NA | NA |
| Control | fail | fail | fail | fail | fail | fail | NA | NA | NA |
| Luwax S (A) | fail | fail | fail | fail | fail | fail | NA | NA | NA |
| Luwax V (A) | fail | fail | fail | fail | fail | 20% fail | fail | fail | fail |
| Luwax V (B) | pass | slight fail | fail | fail | slight fail | fail | fail | fail | fail |
| Joncryl 538A (A) | fail | pass | 50% fail | fail | fail | fail | fail | slight | fail |
| Joncryl 538A (B) | pass | pass | 50% fail | fail | fail | fail | NA | NA | NA |
| Joncryl 611 (A) | pass | pass | pass | fail | fail | fail | slight | fail | fail |
| Joncryl 611 (B) | fail | pass | pass | fail | pass | fail | slight | fail | fail |
| Joncryl 682 (A) | pass | slight fail | 20% fail | fail | fail | fail | fail | slight | fail |
| Joncryl 682 (B) | fail | slight fail | fail | slight fail | slight fail | fail | fail | slight | fail |
| Michem (A) | pass | pass | pass | slight fail | pass | 10% fail | fail | pass | pass |
| Michem (B) | pass | pass | pass | pass | pass | pass | fail | pass | pass |
| Control (A) | pass | pass | 50% fail | pass | pass | fail | slight | slight | 50% |
| Control (B) | pass | pass | 50% fail | pass | fail | fail | slight | slight | fail |

* fail = partial fail due to inadequate tape adhesion to surface; ink easily removed

TABLE 3

| | | | | | imm | 1 hr | 1 hr |
|---|---|---|---|---|---|---|---|
| | | | | | ambient water soak | | |
| Formulation | Caustic Test Score | scratch | 610 tape | 810 tape | scratch | scratch | 610 tape |
| BYK111 + J 682 (A) | 1 | pass | pass | 10% | fail | fail | fail |
| BYK111 + J 682 (B) | 1 | fail | pass | 50% | fail | fail | fail |
| BYK111 + J 682 (C) | 2 | fail | pass | 20% | fail | fail | fail |
| CITRIC + J 682 (A) | 2 | fail | pass | 100% | fail | fail | fail |
| CITRIC + J 682 (B) | 1 | fail | pass | 60% | fail | fail | fail |
| CITRIC + J 682 (C) | 1 | fail | fail | 20% | fail | pass | fail |
| BYK111 + J538A (A) | 1 | pass | pass | 20% | fail | pass | fail |
| BYK111 + J538A (B) | 2 | pass | pass | 20% | fail | slight | fail |
| BYK111 + J538A (C) | 1 | pass | pass | 100% | fail | slight | fail |
| CITRIC + J538A (A) | 0 | pass | pass | 60% | fail | slight | fail |
| CITRIC + J538A (B) | 0 | pass | pass | 20% | fail | fail | fail |
| CITRIC + J538A (C) | 1 | pass | pass | pass | moderate | pass | fail |
| BYK111 + DURACOTE (A) | 1 | slight | pass | pass | fail | fail | fail |
| BYK111 + DURACOTE (B) | 2 | slight | pass | pass | fail | fail | fail |
| BYK111 + DURACOTE (C) | 1 | slight | pass | pass | fail | fail | fail |

TABLE 3-continued

| Formulation | | | | | | | |
|---|---|---|---|---|---|---|---|
| CITRIC + DURACOTE (A) | 0 | slight | pass | 20% | pass | pass | fail |
| CITRIC + DURACOTE (B) | 0 | slight | pass | pass | slight | pass | fail |
| CITRIC + DURACOTE (C) | 0 | slight | pass | pass | moderate | slight | fail |
| BYK111 + MICHEM (A) | 1 | slight | pass | 50% | fail | pass | pass |
| BYK111 + MICHEM (B) | 1 | pass | pass | pass | fail | pass | pass |
| BYK111 + MICHEM (C) | 1 | slight | pass | pass | fail | pass | 20% |
| CONTROL (A) | 0 | slight | pass | pass | slight | pass | fail |
| CONTROL (B) | 0 | slight | pass | pass | slight | slight | fail |

| | imm | 1 hr ice water soak | 1 hr | imm | 1 hr 75C Caustic soak | imm |
|---|---|---|---|---|---|---|
| Formulation | scratch | scratch | 610 tape | scratch | scratch | 610 tape |
| BYK111 + J 682 (A) | fail | fail | pass | fail | fail | fail |
| BYK111 + J 682 (B) | fail | slight | pass | fail | fail | fail |
| BYK111 + J 682 (C) | fail | slight | pass | fail | fail | fail |
| CITRIC + J 682 (A) | fail | slight | fail | fail | fail | fail |
| CITRIC + J 682 (B) | fail | slight | pass | fail | fail | fail |
| CITRIC + J 682 (C) | fail | fail | pass | fail | fail | fail |
| BYK111 + J538A (A) | fail | pass | fail | fail | fail | fail |
| BYK111 + J538A (B) | fail | pass | fail | fail | fail | fail |
| BYK111 + J538A (C) | fail | slight | fail | fail | fail | fail |
| CITRIC + J538A (A) | fail | fail | fail | fail | slight | fail |
| CITRIC + J538A (B) | fail | pass | fail | fail | slight | fail |
| CITRIC + J538A (C) | fail | pass | pass | fail | fail | fail |
| BYK111 + DURACOTE (A) | fail | fail | pass | fail | fail | fail |
| BYK111 + DURACOTE (B) | fail | fail | fail | fail | fail | fail |
| BYK111 + DURACOTE (C) | fail | fail | 50% | fail | slight | fail |
| CITRIC + DURACOTE (A) | pass | slight | fail | slight | slight | fail |
| CITRIC + DURACOTE (B) | pass | slight | fail | slight | slight | fail |
| CITRIC + DURACOTE (C) | pass | slight | fail | slight | slight | fail |
| BYK111 + MICHEM (A) | pass | pass | pass | pass | slight | 50% |
| BYK111 + MICHEM (B) | pass | slight | pass | pass | slight | 50% |
| BYK111 + MICHEM (C) | pass | pass | pass | slight | slight | fail |
| CONTROL (A) | pass | pass | fail | pass | slight | fail |
| CONTROL (B) | pass | pass | pass | slight | slight | fail |

TABLE 4

| Formulation | Caustic Test Score | scratch | 610 tape | 810 tape | imm ambient water soak scratch | 1 hr scratch | 1 hr 610 tape |
|---|---|---|---|---|---|---|---|
| Ceraflour 998 (A) | 0 | pass | pass | pass | pass | pass | pass |
| Ceraflour 998 (B) | 1 | pass | pass | pass | pass | pass | pass |
| SMA1440 (50% solids) (A) | 4 | pass | 50% | fail | pass | pass | pass |
| SMA1440 (50% solids) (B) | 5 | pass | pass | 50% | pass | pass | 50% |
| SMA1440 (50% solids) (C) | 4 | pass | pass | fail | pass | pass | 50% |
| SMA1440, 50% (25% solids) (A) | 4 | pass | pass | pass | pass | pass | pass |
| SMA1440, 50% (25% solids) (B) | 3 | pass | pass | pass | pass | pass | 50% |
| SMA1440, 50% (25% solids) (C) | 4 | pass | pass | pass | pass | pass | 50% |
| SMA3840 (A) | 2 | pass | pass | pass | pass | pass | pass |
| SMA3840 (B) | 2 | pass | pass | pass | pass | pass | pass |
| SMA3840 (C) | 1 | pass | pass | pass | pass | pass | pass |
| J682, 50% (A) | 0 | pass | pass | pass | pass | pass | pass |
| J682, 50% (B) | 1 | pass | pass | pass | fail | fail | fail |
| SMA1440/1% 998 (A) | 4 | pass | pass | pass | pass | pass | pass |
| SMA1440/1% 998 (B) | 4 | pass | pass | pass | pass | pass | pass |
| SMA1440/1% 998 (C) | 4 | pass | pass | pass | fail | pass | pass |
| Control (A) | 0 | pass | pass | slight | pass | pass | pass |
| Control (B) | 0 | pass | pass | pass | pass | pass | pass |

| | imm ice water soak | 1 hr | 1 hr | imm 75C Caustic Soak | 1 hr | 1 hr |
|---|---|---|---|---|---|---|
| Formulation | scratch | scratch | 610 tape | scratch | scratch | 610 tape |
| Ceraflour 998 (A) | pass | pass | pass | pass | pass | pass |
| Ceraflour 998 (B) | pass | pass | pass | pass | pass | pass |

TABLE 4-continued

| | | | | | | |
|---|---|---|---|---|---|---|
| SMA1440 (50% solids) (A) | pass | pass | 10% | fail | fail | fail |
| SMA1440 (50% solids) (B) | pass | pass | fail | fail | fail | fail |
| SMA1440 (50% solids) (C) | pass | pass | fail | fail | fail | fail |
| SMA1440, 50% (25% solids) (A) | pass | pass | pass | fail | fail | fail |
| SMA1440, 50% (25% solids) (B) | pass | fail | pass | fail | fail | fail |
| SMA1440, 50% (25% solids) (C) | pass | pass | pass | fail | fail | fail |
| SMA3840 (A) | pass | pass | pass | pass | pass | 50% |
| SMA3840 (B) | pass | pass | pass | pass | pass | 20% |
| SMA3840 (C) | pass | pass | pass | pass | pass | pass |
| J682, 50% (A) | pass | pass | pass | pass | pass | pass |
| J682, 50% (B) | fail | pass | pass | fail | fail | fail |
| SMA1440/1% 998 (A) | pass | pass | pass | fail | fail | fail |
| SMA1440/1% 998 (B) | pass | pass | pass | fail | fail | fail |
| SMA1440/1% 998 (C) | pass | pass | fail | fail | fail | fail |
| Control (A) | pass | pass | pass | pass | pass | pass |
| Control (B) | pass | pass | pass | pass | pass | pass |

TABLE 5

| Formulation | Caustic Test Score | scratch | 610 tape | 810 tape | imm ambient scratch | 1 hr water soak scratch | 1 hr 610 tape |
|---|---|---|---|---|---|---|---|
| Control A | 0 | pass | fail | fail | pass | pass | fail |
| Control B | 0 | pass | fail | fail | pass | pass | fail |
| Control C | 0 | pass | fail | fail | pass | pass | fail |
| Control D | 0 | pass | pass | fail | pass | pass | fail |
| Control E | 0 | pass | pass | pass | pass | pass | fail |
| Control F | 0 | pass | pass | fail | pass | pass | pass |
| SMA1440 (in acetone) as primer A | 2 | pass | pass | pass | pass | pass | pass |
| SMA1440 (in acetone) as primer B | 3 | pass | pass | pass | pass | pass | pass |
| SMA1440 (in acetone) as primer C | 3 | pass | pass | pass | pass | pass | pass |
| SMA1440 (in acetone) as primer D | 4 | pass | pass | pass | pass | pass | pass |
| SMA1440 (in acetone) as primer E | 4 | pass | pass | pass | pass | pass | pass |
| SMA1440 (in acetone) as primer F | 3 | pass | pass | pass | pass | pass | pass |
| SMA1440 (in acetone) as primer A | 5 | pass | pass | pass | pass | pass | pass |
| SMA1440 (in acetone) as primer B | 5 | pass | pass | pass | pass | pass | pass |
| SMA1440 (in acetone) as primer C | 4 | pass | pass | pass | pass | pass | fail |
| SMA1440 (in acetone) as primer D | 4 | pass | pass | pass | pass | pass | pass |
| SMA1440 (in acetone) as primer E | 5 | pass | pass | pass | pass | pass | pass |
| SMA1440 (in acetone) as primer F | 5 | pass | pass | pass | pass | pass | fail |
| SMA1440 (& 10% acetone) in ink A | 5 | pass | pass | pass | pass | pass | pass |
| SMA1440 (& 10% acetone) in ink B | 4 | pass | pass | pass | pass | pass | pass |
| SMA1440 (& 10% acetone) in ink C | 3 | pass | pass | fail | pass | pass | pass |
| SMA1440 (& 10% acetone) in ink D | 4 | pass | pass | pass | pass | pass | fail |
| SMA1440 (& 10% acetone) in ink E | 4 | pass | fail | pass | pass | pass | fail |
| SMA1440 (& 10% acetone) in ink F | 5 | pass | pass | pass | pass | pass | fail |
| SMA1440 (& 3% acetone) in ink A | 4 | pass | pass | fail | pass | pass | pass |
| SMA1440 (& 3% acetone) in ink B | 3 | pass | pass | pass | pass | pass | fail |
| SMA1440 (& 3% acetone) in ink C | 4 | pass | pass | fail | pass | pass | pass |
| SMA1440 (& 3% acetone) in ink D | 4 | pass | pass | pass | pass | pass | pass |
| SMA1440 (& 3% acetone) in ink E | 4 | pass | pass | pass | pass | pass | pass |
| SMA1440 (& 3% acetone) in ink F | 3 | pass | pass | pass | pass | pass | pass |

TABLE 5-continued

| Formulation | imm ice water soak scratch | 1 hr scratch | 1 hr 610 tape | imm 75C Caustic Soak scratch | 1 hr scratch | 1 hr 610 tape |
|---|---|---|---|---|---|---|
| Control A | pass | pass | pass | fail | fail | fail |
| Control B | pass | pass | pass | fail | fail | fail |
| Control C | pass | pass | fail | fail | fail | fail |
| Control D | pass | pass | fail | fail | fail | fail |
| Control E | pass | pass | pass | fail | fail | fail |
| Control F | pass | pass | pass | fail | fail | fail |
| SMA1440 (in acetone) as primer A | pass | pass | pass | fail | fail | fail |
| SMA1440 (in acetone) as primer B | pass | pass | pass | fail | fail | fail |
| SMA1440 (in acetone) as primer C | pass | pass | pass | fail | fail | fail |
| SMA1440 (in acetone) as primer D | pass | pass | pass | fail | fail | fail |
| SMA1440 (in acetone) as primer E | pass | pass | pass | fail | fail | fail |
| SMA1440 (in acetone) as primer F | pass | pass | pass | fail | fail | fail |
| SMA1440 (in acetone) as primer A | pass | pass | pass | NA* | NA* | NA* |
| SMA1440 (in acetone) as primer B | pass | pass | pass | NA* | NA* | NA* |
| SMA1440 (in acetone) as primer C | pass | pass | pass | fail | fail | fail |
| SMA1440 (in acetone) as primer D | pass | pass | pass | fail | fail | fail |
| SMA1440 (in acetone) as primer E | pass | pass | pass | NA* | NA* | NA* |
| SMA1440 (in acetone) as primer F | pass | pass | pass | NA* | NA* | NA* |
| SMA1440 (& 10% acetone) in ink A | pass | pass | pass | NA* | NA* | NA* |
| SMA1440 (& 10% acetone) in ink B | pass | pass | pass | fail | fail | fail |
| SMA1440 (& 10% acetone) in ink C | pass | pass | pass | fail | fail | fail |
| SMA1440 (& 10% acetone) in ink D | pass | pass | pass | fail | fail | fail |
| SMA1440 (& 10% acetone) in ink E | pass | pass | pass | fail | fail | fail |
| SMA1440 (& 10% acetone) in ink F | pass | pass | pass | NA* | NA* | NA* |
| SMA1440 (& 3% acetone) in ink A | pass | pass | pass | fail | fail | fail |
| SMA1440 (& 3% acetone) in ink B | pass | pass | pass | fail | fail | fail |
| SMA1440 (& 3% acetone) in ink C | pass | pass | pass | fail | fail | fail |
| SMA1440 (& 3% acetone) in ink D | pass | pass | pass | fail | fail | fail |
| SMA1440 (& 3% acetone) in ink E | pass | pass | pass | fail | fail | fail |
| SMA1440 (& 3% acetone) in ink F | pass | pass | pass | fail | fail | fail |

NA*= ink removal too great to test (all ink removed)

As the data show, the SMA3840 and SMA1440F ink formulation samples exhibited improved performance. The SMA3840 ink formulation showed some signal of improvement, which indicates an improvement in ink removal when compared to control. The SMA1440F ink formulation demonstrated no significant signal during normal use ("in use") tests, but strong removal during caustic wash testing. Testing was repeated several times on PET, EPET, and PE, all showing good removal in the caustic test.

2. Example 2

For this example, ink compositions, including white UV-curable ink having a removal-promoting additive and a carrier, were direct printed on the surface of a polyethylene terephthalate (PET) and high density polyethylene (HDPE) samples and cured. The removal-promoting additive of the tested samples was styrene maleic anhydride copolymer (SMA1440F, commercially available from Cray Valley USA, LLC), and the carrier was N-methyl-2-pyrrolidone (NMP, commercially available from Sigma Aldrich). The ink formulations and performance data are provided in Table 6 below.

TABLE 6

| Ink Formulation | Test 1 | Test 2 | Test 3 |
|---|---|---|---|
| Ink 1 - commercially available UV inkjet white ink | ~50% | ~30% | ~55% |
| Ink 2 - Ink 1 + removal promoting additive & carrier | ~85% | ~95% | ~98% |

% ink removed/clean flakes (based on visual analysis)

As the data show, near 100% removal of the inventive ink compositions were observed compared with only 50-60% removal of the standard ink controls. On HDPE samples, the inventive ink compositions exhibited greater than 50% ink removal compared to only approximately 10% ink removal for the standard ink controls. The inventive ink compositions results satisfy the current recycle guidelines published by The Association of Postconsumer Plastic Recyclers.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An ink composition for digital printing onto a plastic article, the ink composition comprising:
 (a) from about 65 to about 85 weight percent of an ultraviolet-curable (UV-curable base ink;

(b) from about 5 to about 20 weight percent of an ink removal-promoting additive having a glass transition temperature ($T_2$) of less than about 70° C.; and (c) from about 5 to about 15 weight percent of a carrier capable of dissolving at least a portion of the ink removal-promoting additive.

2. The ink composition of claim 1, wherein the ink removal-promoting additive comprises a styrene maleic anhydride copolymer.

3. The ink composition of claim 1, wherein the ink removal-promoting additive has a glass transition temperature (Tg) in the range of from about 55° C. to about 65° C.

4. The ink composition of claim 1, wherein the ink removal-promoting additive has an acid number in the range of from about 165 mg KOH/gm to about 205 mg KOH/gm.

5. The ink composition of claim 1, wherein the carrier is one or more aprotic solvents.

6. The ink composition of claim 5, wherein the carrier is N-methyl-2-pyrrolidone (NMP), acetone, or a combination thereof.

7. The ink composition of claim 1, wherein the carrier is an acrylic monomer selected from 1,3-butylene glycol diacrylate, 1,6-hexanediol diacrylate, 1,3-butylene glycol dimethacrylate, isobornyl acrylate, isodecyl methacrylate, and a combination thereof.

8. The ink composition of claim 1, wherein the UV-curable base ink is a white UV-curable base ink.

9. The ink composition of claim 2, wherein the solvent is N-methyl-2-pyrrolidone (NMP), acetone, or a combination thereof.

10. The ink composition of claim 9, wherein the UV-curable base ink is a white UV-curable base ink.

11. An ink composition for digital printing onto a plastic article, the ink composition comprising:

(a) from about 65 to about 85 weight percent of an ultraviolet-curable (UV-curable) ink;

(b) from about 5 to about 20 weight percent of an ink removal-promoting additive having one or more selected from an acid number in the range of from about 100 mg KOH/gm to about 250 mg KOH/gm and a glass transition temperature (Tg) of less than about 130° C.; and (c) from about 5 to about 15 weight percent of a carrier capable of dissolving at least a portion of the ink removal-promoting additive, wherein the carrier consists of one or more aprotic solvents, one or more acrylic monomers, or a combination thereof.

12. The ink composition of claim 11, wherein the ink removal-promoting additive is a styrene maleic anhydride copolymer.

13. An ink composition for digital printing onto a plastic article, the ink composition consisting essentially of:

(a) from 71 to 85 weight percent of a UV-curable base ink;

(b) from about 5 to about 20 weight percent of an ink removal-promoting additive having one or more selected from a glass transition temperature (Tg) less than about 130° C. and an acid number in the range of from about 100 mg KOH/gm to about 250 mg KOH/gm; and (c) from about 5 to about 15 weight percent of a carrier capable of dissolving at least a portion of the ink removal-promoting additive.

14. The ink composition of claim 13, wherein the UV-curable base ink is a white UV-curable base ink.

15. The ink composition of claim 13, wherein the ink removal-promoting additive is a styrene maleic anhydride copolymer.

16. The ink composition of claim 13, wherein the solvent is N-methyl-2-pyrrolidone (NMP), acetone, or a combination thereof.

17. The ink composition of claim 11, wherein the UV-curable base ink is a white UV-curable base ink.

18. The ink composition of claim 11, wherein the solvent is N-methyl-2-pyrrolidone (NMP), acetone, or a combination thereof.

19. The ink composition of claim 12, wherein the solvent is N-methyl-2-pyrrolidone (NMP), acetone, or a combination thereof.

20. The ink composition of claim 17, wherein the UV-curable base ink is a white UV-curable base ink.

* * * * *